Figure 1:
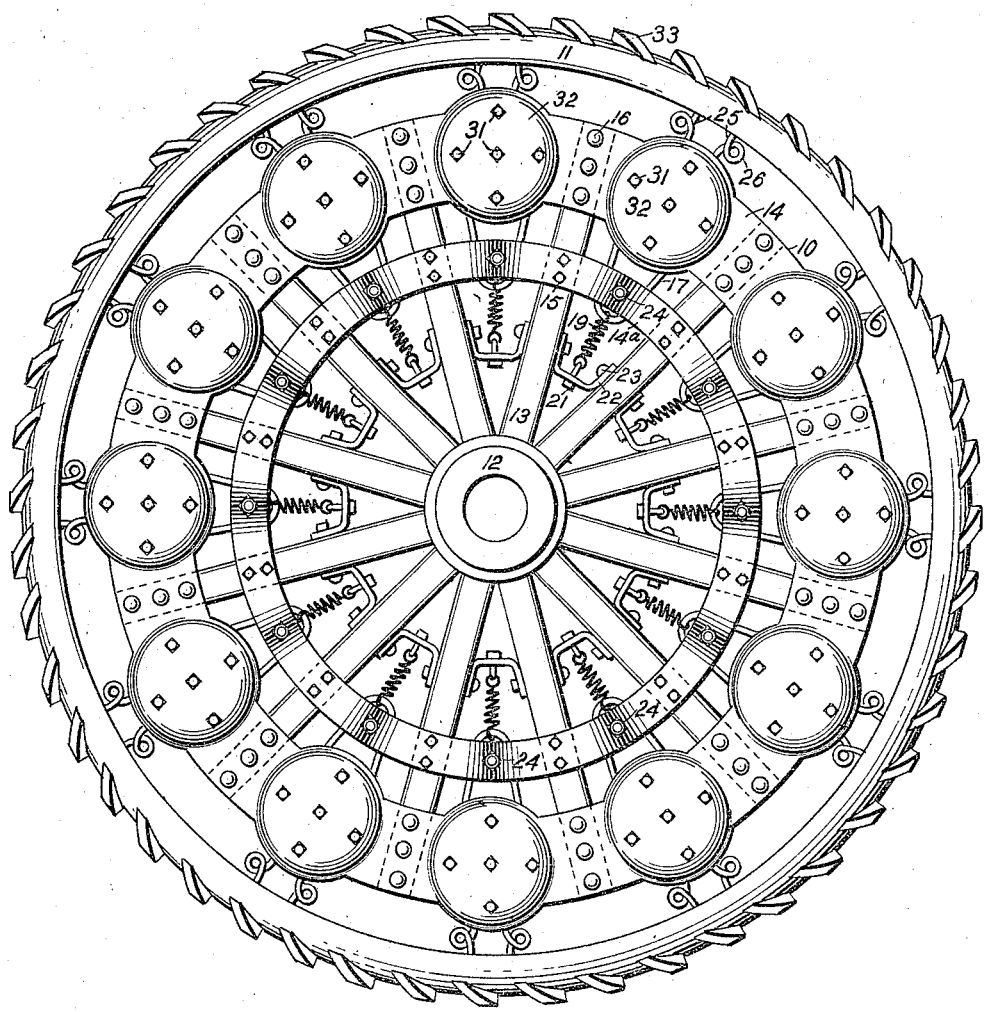

J. EHRHARD.
SPRING WHEEL.
APPLICATION FILED FEB. 1, 1916.

1,184,522.

Patented May 23, 1916.
2 SHEETS—SHEET 1.

WITNESSES
H. J. Walker

INVENTOR
Joseph Ehrhard
BY
ATTORNEYS

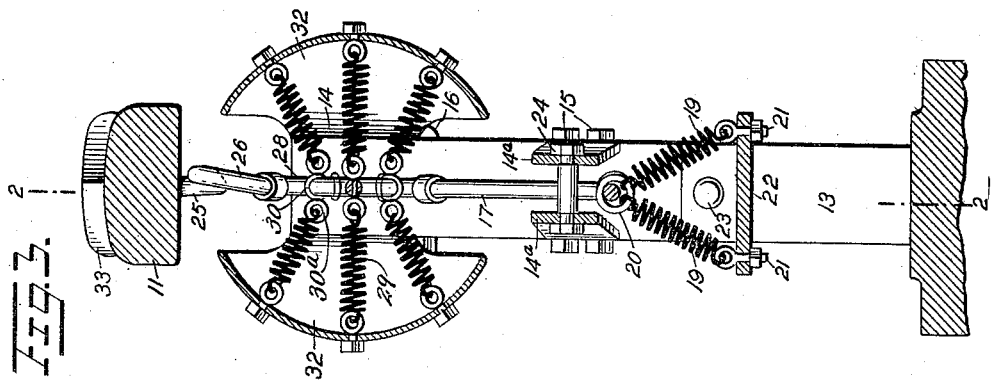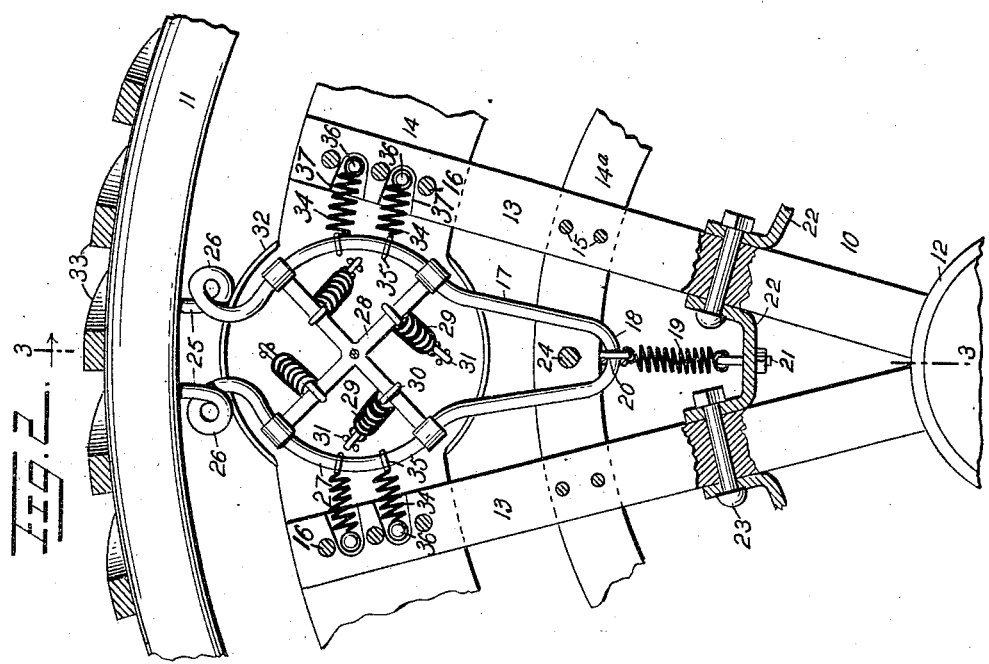

UNITED STATES PATENT OFFICE.

JOSEPH EHRHARD, OF CURTIS, OKLAHOMA, ASSIGNOR OF ONE-HALF TO SAM SHIELDS, OF QUINLAN, OKLAHOMA.

SPRING-WHEEL.

1,184,522. Specification of Letters Patent. Patented May 23, 1916.

Application filed February 1, 1916. Serial No. 75,506.

*To all whom it may concern:*

Be it known that I, JOSEPH EHRHARD, a citizen of the United States, and a resident of Curtis, in the county of Woodward and State of Oklahoma, have invented a new and Improved Spring-Wheel, of which the following is a full, clear, and exact description.

My invention relates to the class of spring wheels for automobiles and other vehicles in which a rim is resiliently connected with the body or rigid inner section of the wheel.

The invention has in view the production of a wheel of the class referred to in which the rim will be supported by resilient units so constructed and arranged as to result in a shock or yielding at one portion of the wheel being distributed to the several units throughout the wheel.

The invention also has for its purpose to provide for repair or renewal, at a minimum expense, of the spring elements entering into the resilient units.

Other objects and advantages of my improved spring wheel will appear from the specific description following.

Reference is to be had to the accompanying drawings forming a part of this specification in which similar reference characters indicate corresponding parts in all the views.

Figure 1 is a side elevation of a wheel embodying my invention; Fig. 2 is a fragmentary section in the plane of the wheel on an enlarged scale, the section being taken on the line 2—2, Fig. 3; and Fig. 3 is a cross section on the line 3—3, Fig. 2.

In constructing a wheel embodying my invention, a rigid inner section 10 is provided and a resiliently supported rim section 11. The rigid inner section has any suitable hub 12 and elements connected with the hub and extending radially therefrom, and serving as supporting means for resilient units. In the present example, rigid spokes 13 extend radially from the hub and these are connected by concentric rings, 14, 14ª, said rings being disposed in pairs at the opposite sides of the spokes and suitably secured to the latter as by bolts, 15, 16.

The resilient units that yieldingly connect the rim 11 with the rigid inner section, each include a major spring 17 formed of wire bent into substantially U-shape, said springs being disposed radially about the wheel, the bend 18, of each spring, being at the inner end thereof. Retractile springs 19 are connected with the bend 18 of each spring by suitable means such as rings 20 and said springs diverge toward the inner ends and are connected by bolts 21, or the like, with a plate 22. The plates 22 are approximately of U-shape and are interposed between the several spokes 13 and secured to the latter by bolts 23, or equivalent means. If desired, transverse pins or bolts 24 may extend between the pair of rings 14ª, between the spokes 13. The said bolts or pins 25 pass between the arms of the major springs 17 adjacent to the bend 18 of each spring, to limit the displacement of the spring in a direction radially outward.

The ends 25 of the arms of each spring 17 are entered in the inner side of the rim 11. Adjacent to the rim 11, the said arms of the spring 17 have spring coils 26 therein, whereby to afford inherent local resiliency in said springs 17 in a radial direction.

In order to permit a limited play of the springs 17, in the plane of the wheel and transverse to the radial movements of said springs, a series of retractile springs 29 is provided in connection with each of said springs 17, whereby all the springs 17 may accommodate themselves to a radial movement of one or more springs. A plurality of the retractile springs 29 is provided for each spring 17, each spring 29 being connected at one end to a suitable frame 28, here shown as a spider, there being rings 30 embracing the arms of the frame 28 and presenting eyes 30ª into which the springs 29 are hooked at their inner ends. The outer ends of the springs 29, of which there may be any suitable number, may be secured to eye-bolts 31, or the like, on the cupped enlargements 32, formed on the outer rings 14. To accommodate the frame 28 and springs 29, the side arms of each spring 17 curve away from each other as at 27.

The springs 17 of the resilient units, it will be observed, are, according to the above construction and arrangement, essentially floating springs, permitting a freedom of movement of the said springs, that they may readily accommodate themselves to strains in different directions, so that the shock or strain on any one spring 17 will be distributed to the several resilient units throughout the wheel.

The rim 11 may have suitable tread members 33 to prevent skidding and afford the necessary traction. As here shown, said members 33 are V-shape, the sides converging at the median line of the wheel and the several members being spaced a proper distance peripherally of the wheel.

If desired, additional coil springs 34 may be employed at each side of the U-spring 17 and connected in any suitable manner with said spring and the adjacent spoke 13. As shown, the springs 34 have hooks 35 at one end engaging the springs 17, and at the opposite ends the said springs 34 engage pins 36 in pockets 37 in said spokes 13.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent:

1. A spring wheel including a rigid body provided with a hub, a separate rim constituting the tread of the wheel, radially disposed U-shaped springs having the bends thereof at the inner ends and presenting side arms extending radially outward and secured to the rim, said arms being formed with integral spring coils adjacent to the rim, separate retractile springs connected with the U-shaped springs at the bends thereof and with the rigid body, a frame between and connecting the side arms of the U-shaped springs outward from the said retractile springs, and a series of retractile springs arranged in connection with each of said frames, said series of springs being disposed at angles to one another and each connected at one end with the adjacent frame, the opposite ends of the springs of each series being connected with the rigid body.

2. A spring wheel including a rigid body, a separate rim around the body and spaced therefrom, the said body presenting spokes and rings extending around the spokes at opposite sides and secured to said spokes, the respective rings having opposed cup-shaped enlargements between the spokes, radial U-shaped springs disposed between the spokes and between said rings and movable bodily relatively thereto, the outer ends of the springs being secured to said rim, spring means yieldingly connecting the inner ends of the springs with the rigid body, said U-shaped springs presenting side arms, a frame connecting the side arms of each spring, and a series of retractile springs at angles to one another, the springs of the series being each connected at one end with the said frame and secured at their opposite ends with the cup-shaped enlargements of the said rings, the arms of the U-shaped springs being secured at their outer ends to said rim.

In testimony whereof I have signed my name to this specification in the presence of two subscribing witnesses.

JOSEPH EHRHARD.

Witnesses:
R. E. HUFFMAN,
S. D. SHIELDS.

Copies of this patent may be obtained for five cents each, by addressing the "Commissioner of Patents, Washington, D. C."